United States Patent [19]
Suzuki

[11] Patent Number: 5,828,467
[45] Date of Patent: Oct. 27, 1998

[54] BLOCK NOISE PREVENTION BY SELECTIVE INTERPOLATION OF DECODED IMAGE DATA

[75] Inventor: Kazuhiro Suzuki, Nakai-machi, Japan

[73] Assignee: Fuji Xerox Co., Ltd., Tokyo, Japan

[21] Appl. No.: 725,323

[22] Filed: Oct. 2, 1996

[51] Int. Cl.$^6$ .................................................. H04N 1/41
[52] U.S. Cl. ...................... 358/428; 358/261.3; 358/432; 382/232
[58] Field of Search .................................... 358/426, 428, 358/261.1, 261.3, 261.4, 448, 430, 432; 382/232, 233, 238, 248, 251

[56] References Cited

U.S. PATENT DOCUMENTS

| | | | |
|---|---|---|---|
| 4,903,138 | 2/1990 | Aragaki | 358/261.3 |
| 5,023,919 | 6/1991 | Wataya | 382/54 |
| 5,327,257 | 7/1994 | Hyrtzak et al. | 358/447 |
| 5,454,051 | 9/1995 | Smith | 382/233 |
| 5,566,002 | 10/1996 | Shikakura | 358/433 |
| 5,629,778 | 5/1997 | Reuman | 358/426 |

FOREIGN PATENT DOCUMENTS

| | | |
|---|---|---|
| A-2-57067 | 2/1990 | Japan . |
| A-3-13064 | 1/1991 | Japan . |
| A-4-209073 | 7/1992 | Japan . |

OTHER PUBLICATIONS

Geometric Processing Engineering by Computer Display (1), pp. 101–149, by Nikkan Kogyo Shinbunsha, Oct. 30, 1982.

Primary Examiner—Peter S. Wong
Assistant Examiner—Derek J. Jardieu
Attorney, Agent, or Firm—Oliff & Berridge, PLC

[57] ABSTRACT

An image processor for improving the quality of a picture, in which block noise arises as a result of a block encoding operation, by rendering gradations between blocks contiguous. A control point determination section reads references pixels from a decoded image storage section in accordance with a block address output from a block address generating section. The control point determination section then outputs control point information. A boundary condition determination section determines vector information on the basis of the control point information. An interpolating section interpolates a pixel block using a bicubic interpolated surface, and the thus interpolated pixel block is held in a buffer. A control point comparison section determines whether the pixel block can be interpolated and outputs prohibition information. On the other hand, a pixel block output from an 8 by 8 pixel block reading section is held in another buffer. As a result, an in-block variance calculating section calculates variance and then outputs variance information. A buffer switch determination section selects either of the buffers depending on the prohibition information and the variance information, whereby a buffer switch is switched. The thus selected output is held in a reproduced image storage section.

18 Claims, 10 Drawing Sheets

BLOCK NOISE PREVENTION BY SELECTIVE INTERPOLATION OF DECODED IMAGE DATA

BACKGROUND OF THE INVENTION

1. Field of the Invention

The present invention relates to an image processor for processing an image into which a block-encoded image has been decoded.

2. Description of the Prior Art

In the case of encoding an image signal, an image is divided into image blocks which are rectangular image areas in order to utilize the correlation between pixels in both vertical and horizontal directions as well as to prevent the size of an image processor from increasing, and the image blocks are encoded one by one. A representative algorithm for use in such an encoding system is generally called a block encoding algorithm which comprises a transform coding algorithm, block truncation coding algorithm, and a vector quantization algorithm.

For the image encoding method, there are a lossless encoding method which makes it possible to decode an encoded image to an image completely identical with the original without loss of information, and a lossy encoding method for reducing information which is visually unnecessary. The feature of the lossy encoding method is that it is easy to obtain a high compression ratio in spite of the distortion resulting from a reduction in the information. The previously described transform encoding algorithm is one example of the lossy block encoding method.

Where an image signal is transmitted or stored after having been encoded, it is desirable to encode the image signal at the highest possible compression ratio in order to efficiently utilize a storage medium as well as to reduce a communication time. Particularly for high-resolution images, there is considered to be a strong demand for the encoding of an image at the highest possible compression ratio, because the high-resolution images have a large volume of data. For this reason, an lossy block encoding method which provides a high compression ratio is widely used.

The transform coding method which is one of the lossy block encoding methods will be further described hereinbelow.

It is well known that in images known as natural images, such as landscapes or portraits, there is a tendency for adjacent pixels to have similar pixel values, and for the natural images to have high auto-correlation properties. If a signal having such high auto-correlation properties is represented on a frequency axis, the signal power becomes concentrated around the lower frequency components. The transform coding method reduces the volume of information of the image signal by utilization of the above described properties.

According to the transform coding method, the image signal is initially divided into pixel blocks which are rectangular pixel regions, and the pixel blocks are subjected to two-dimensional orthogonal transform. As a result, transform coefficients which are the information of a spatial frequency is obtained. Then, the volume of information is reduced by quantizing the thus obtained transform coefficient. To encode a natural image, it is common practice to reduce the volume of information by more accurately quantizing the transform coefficient of lower frequency components and by more roughly quantizing the transform coefficient of higher frequency components. This is attributable to the previously described characteristics where the majority of the signal power is concentrated on lower transform coefficients, and to the fact that because the human visual system degrades high frequency components, they are less likely to be detectable.

However, according to the transform encoding method, the degree of gradations in the boundary between the pixel blocks within the area where the shade of color changes by small degrees becomes noticeable in some cases. This is due to the fact that a.c. components in the pixel blocks are lost as a result of rough quantization carried out after the orthogonal transform, so that only d.c. components proportional to a mean value of the pixel blocks are left.

This phenomenon is called block noise and arises not only as a result of the conversion encoding operation but also as a result of other lossy block encoding operations. In other words, this phenomenon arises as a result of an encoding operation being carried out at a high compression ratio. The block noise is artificial noise which has horizontal and vertical directionalities, and this very noticeable noise results in the picture quality being considerably deteriorated.

The degradations in the picture resulting from the encoding operation depend greatly on encoding parameters and the contents of the original, which makes it difficult to forecast degradations resulting from the encoding operation. Therefore, in the case of the transmission of an image, degradation is detected only after the transmitted signal is encoded at the receiving side. If the degradation is acknowledged at the receiving side, it becomes necessary for the receiver to ask a sender to re-transmit the original at a lower compression ratio, which presents problems in terms of time and communication costs.

Techniques for preventing the block noise have been proposed. An example of such a technique is disclosed in, e.g., Japanese Patent Laid-Open Nos. Hei 2-57067(1990) and Hei 3-13064(1991), wherein a filter is provided between blocks where block noise arises. Another example of the techniques is disclosed in, e.g., Japanese Patent Laid-Open No. Hei 4-209073(1992), wherein the gradation level of a pixel (a corner point) located at the corner of a block where pixel degradation takes place is estimated on the basis of corner points of adjacent three blocks, and a difference between the estimated gradation level and the practical gradation level of the corner points is linearly interpolated within the block.

These techniques are intended to cope with localized block noise, and therefore the effect of smoothing operation becomes also localized. For this reason, it has been difficult to say that these prior techniques could sufficiently eliminate the block noise.

SUMMARY OF THE INVENTION

The present invention has been conceived to solve the above described drawbacks in the related art, and the primary object of the present invention is to provide an image processor which improves the quality of a picture containing block noise caused as a result of a block encoding operation by rendering gradations between blocks continuous.

To this end, according to a first aspect of the present invention, there is provided an image processor comprising storage means for holding decoded blocks to which a block-encoded image is decoded for each rectangular region consisting of an M by N matrix of pixels, interpolating means which provides an interpolated block by reading a plurality of reference pixels having a predetermined positional relationship with the decoded blocks from the storage means and by interpolating gradations in the decoded blocks using a curve under boundary conditions set on the basis of the reference pixels, first determination means which determines whether or not the distribution of pixels in the decoded block is flat, on the basis of the statistical information of the decoded block, second determination means which determines whether or not the block can be interpolated, on the basis of the boundary conditions, and selecting means which selects either the interpolated block or the decoded block on the basis of the results of the first and second determination means.

By virtue of the image processor as defined in the first aspect of the present invention, if the pixel distribution has been determined as being flat by the first determination means, and if it has been determined that the block can be interpolated, by the second determination means, the interpolated block is selected. In the interpolated block, the pixel blocks which are adjacent to each other with boundaries between them are generated so as to be in as continuous a condition as possible, thereby reducing the block noise. Where the image has the uneven distribution of the pixels, as an edge portion of the image, the edge portion can be stored by selecting the decoded block. In this way, the block noise is eliminated from the image for each pixel block in the way suitable to each block.

According to a second aspect of the present invention, there is provided an image processor comprising storage means for holding decoded blocks to which a block-encoded image is decoded for each rectangular region consisting of an M by N matrix of pixels, interpolating means which provides an interpolated block by reading a plurality of reference pixels having a predetermined positional relationship with the decoded blocks from the storage means and by interpolating gradations in the decoded blocks using a curve under boundary conditions set on the basis of the reference pixels, smoothing means which outputs an M×N matrix of pixels at the center of the block as a smoothed block by reading a (M+2i)×(N+2i) matrix of pixels, which is larger than the M×N matrix of pixels by "i" pixels in both vertical and horizontal directions, from the decoded block in the storage means, and by smoothing the (M+2i)×(N+2i) matrix of pixels read from the storage means, first determination means which determines whether or not the distribution of pixels in the decoded block is flat, on the basis of the statistical information of the decoded block, second determination means which determines whether or not the block can be interpolated, on the basis of the boundary conditions, and selecting means which selects either the interpolated block or the decoded block on the basis of the results of the first and second determination means.

By virtue of the second aspect of the present invention, the smoothed block is selected even if the block cannot be interpolated, to thereby enhance the effect of the elimination of the block noise. As a matter of course, the selecting means may be arranged so as to select any one of the interpolated block, the smoothed block, or the decoded block.

According to a third aspect of the present invention, the image processor as defined in the first or second aspect of the present invention is characterized in that the interpolating means is made up of a control point determination section for determining a control point from the plurality of reference pixels, a boundary condition determination section for determining the boundary conditions from the control point, and an interpolating section for generating an interpolated block by interpolating the rectangular region consisting of the M by N matrix of pixels using bicubic interpolated surface patches on the basis of the boundary conditions.

According to a fourth aspect of the present invention, the image processor as defined in the third aspect of the present invention is characterized in that the control point is located at an intersection between boundaries of the decoded blocks in the storage means, and four pixels around the intersection are read as the plurality of reference pixels for each intersection, whereby a mean value is set.

According to a fifth aspect of the present invention, the image processor as defined in the third aspect of the present invention is characterized in that the boundary conditions include eight tangent vectors defined by differences between four control points on the periphery of the decoded blocks in said storage means and two adjacent control points in the respective vertical and horizontal directions at each control point.

By virtue of these control points and the boundary conditions, the boundary conditions of the adjacent decoded blocks become equal to each other, whereby the interpolated blocks can be smoothly connected.

According to a sixth aspect of the present invention, the image processor as defined in the first or second aspect of the present invention is characterized in that the first determination means calculates the variance of the pixels in the decoded block or a difference between the maximum value and the minimum value of the decoded block, and the first determination means outputs, as the result of first determination, information as to whether or not the decoded block is flat by comparing a predetermined threshold with at least either the pixel variance or the difference. As a result, it becomes possible to detect the area in which block noise arises with high accuracy.

According to a seventh aspect of the present invention, the image processor as defined in the first or second aspect of the present invention is characterized in that the second determination means compares a predetermined threshold value to a difference between adjacent control points as well as comparing a predetermined threshold value to a difference between control points positioned in a diagonal relationship with each other, with regard to four control points around the decoded block, and the second determination means outputs, as the result of second determination, information as to whether or not any of the differences exceeds the threshold values. As a result, it is possible to prevent picture degradation resulting from interpolation from arising at the edge of the block.

According to an eighth aspect of the present invention, the image processor as defined in the first or second aspect of the present invention is characterized in that the value of a pixel which is the most analogous to the reference pixel among pixels in the boundary is set as the value of the reference pixel if the reference pixel is outside the image. As a result, it becomes possible to prevent the edge of the image from being degraded as a result of interpolation.

According to a ninth aspect of the present invention, the image processor as defined in the second aspect of the present invention is characterized by that the selecting means selects any one of the interpolated block, the smoothed block, and the decoded block on the basis of the results of determination of the first and second determination means.

DESCRIPTION OF THE PREFERRED EMBODIMENTS

To begin with, the principle of block noise reduction of the present invention will be described. A bicubic interpolated surface patch is widely used as means for designing and representing the configuration of a complicated surface in the field of CAD or CG. A surface of arbitrary shape is divided into a set of small patches. A bicubic Coons patch is a representative method of defining each patch. According to the bicubic Coons patch, four positional vectors and tangent vectors within a space are set as boundary conditions, and an interpolated patch satisfying these conditions is generated.

Figure 2:
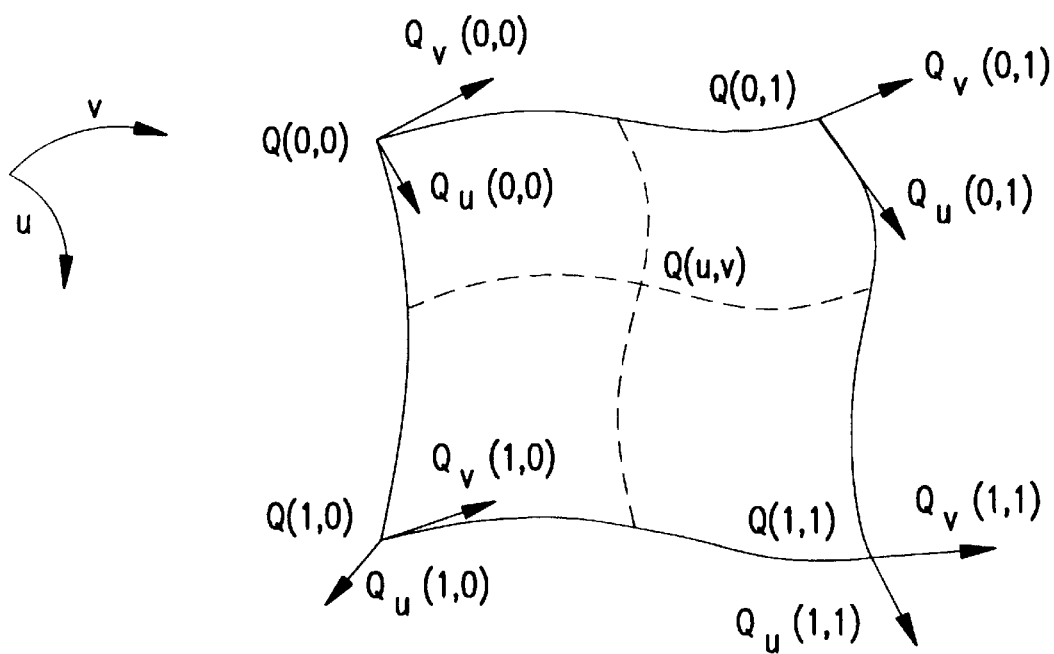
FIG. 2 is a diagrammatic illustration of a bicubic Coons patch.

FIG. 2 is a diagrammatic illustration of the bicubic Coons patch. An interpolated patch is defined in the space of two parameters "u" and "v" ($0 \leq u, v \leq 1$). A point Q (u, v) within the interpolated patch is defined by interpolating four positional vectors Q (0, 0), Q (0, 1), Q (1, 0), and Q (1, 1) and tangent vectors in the directions of "u" and "v" at each positional vector, i.e., a total of eight tangent vectors Qu (0, 0), Qu (0, 1), Qu (1, 0), Qu (1, 1), Qv (0, 0), Qv (0, 1), Qv (1, 0), and Qv (1, 1). A boundary is shared between the thus generated adjacent interpolated patches. Tangent vectors which traverse the boundary curve are also shared between the adjacent interpolated patches. Therefore, the interpolated patches are continuously connected to each other to a first-order differentiated value.

The bicubic Coons patch is represented by subsequent Expression (1). The point Q (u, v) within a patch is calculated by multiplying a 4×4 matrix, which consists of the four positional vectors and the eight tangent vectors, by weights corresponding to the position of the point Q in the "u" and "v" directions, with the weight in the "u" direction being placed on one side of the matrix and the weight in the "v" direction being placed on the other side of the matrix.

$$P(u, v) = [H_{0,0}(u) H_{0,1}(u) H_{1,0}(u) H_{1,1}(u)]$$

$$x = \begin{matrix} Q(0,0) & Q(0,1) & Qv(0,0) & Qv(0,1) & H_{0,0}(v) \\ Q(1,0) & Q(1,1) & Qv(1,0) & Qv(1,1) & H_{0,1}(v) \\ Qu(0,0) & Qu(0,1) & 0 & 0 & H_{1,0}(v) \\ Qu(1,0) & Qu(1,1) & 0 & 0 & H_{1,1}(v) \end{matrix} \quad (1)$$

where $$H_{0,0}(t) = 2t^3 - 3t^2 + 1 = (t-1)^2(2t+1) \quad (2)$$

$$H_{0,1}(t) = -2t^3 + 3t^2 = t^2(3-2t) \quad (3)$$

$$H_{1,0}(t) = t^3 - 2t^2 + t = (t-1)^2 t \quad (4)$$

$$H_{1,1}(t) = t^3 - t^2 = (t-1)t^2 \quad (5)$$

$H_{0,0}$, $H_{0,1}$, $H_{1,0}$, and $H_{1,1}$ are called a blending function. This function provides weights corresponding to the coordinates (u, v).

Figure 3:
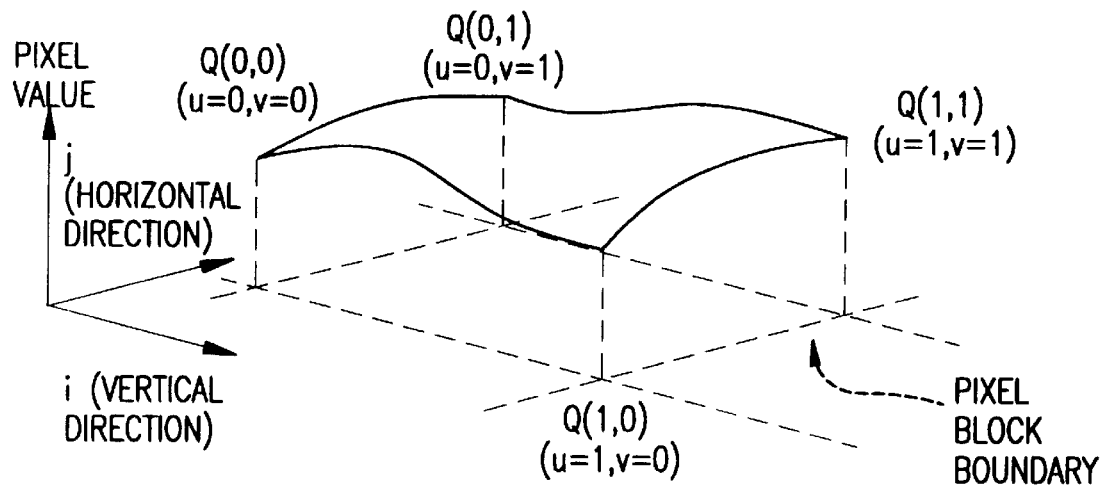
FIG. 3 is a diagrammatic illustration showing the application of the bicubic interpolated surface patch of the present invention to a pixel space.

FIG. 3 is an illustration showing the application of the bicubic interpolated surface patch of the present invention to the pixel space. In the drawing, a broken line corresponds to the boundary between pixel blocks. As shown in FIG. 3, positional vectors and tangent vectors are set for each intersection between the pixel blocks. Blocks which are to be interpolated by the bicubic interpolated surface patch are continuously generated. As previously described, a curve which serves as the boundary between the pixel blocks doubles as the border between interpolated patches of the adjacent pixel blocks. Further, tangent vectors which traverse the boundary curve are also shared between the adjacent pixel blocks. As a result, gradations between the pixel blocks become continuous between the pixel blocks, which makes it possible to reduce block noise.

Figure 1:
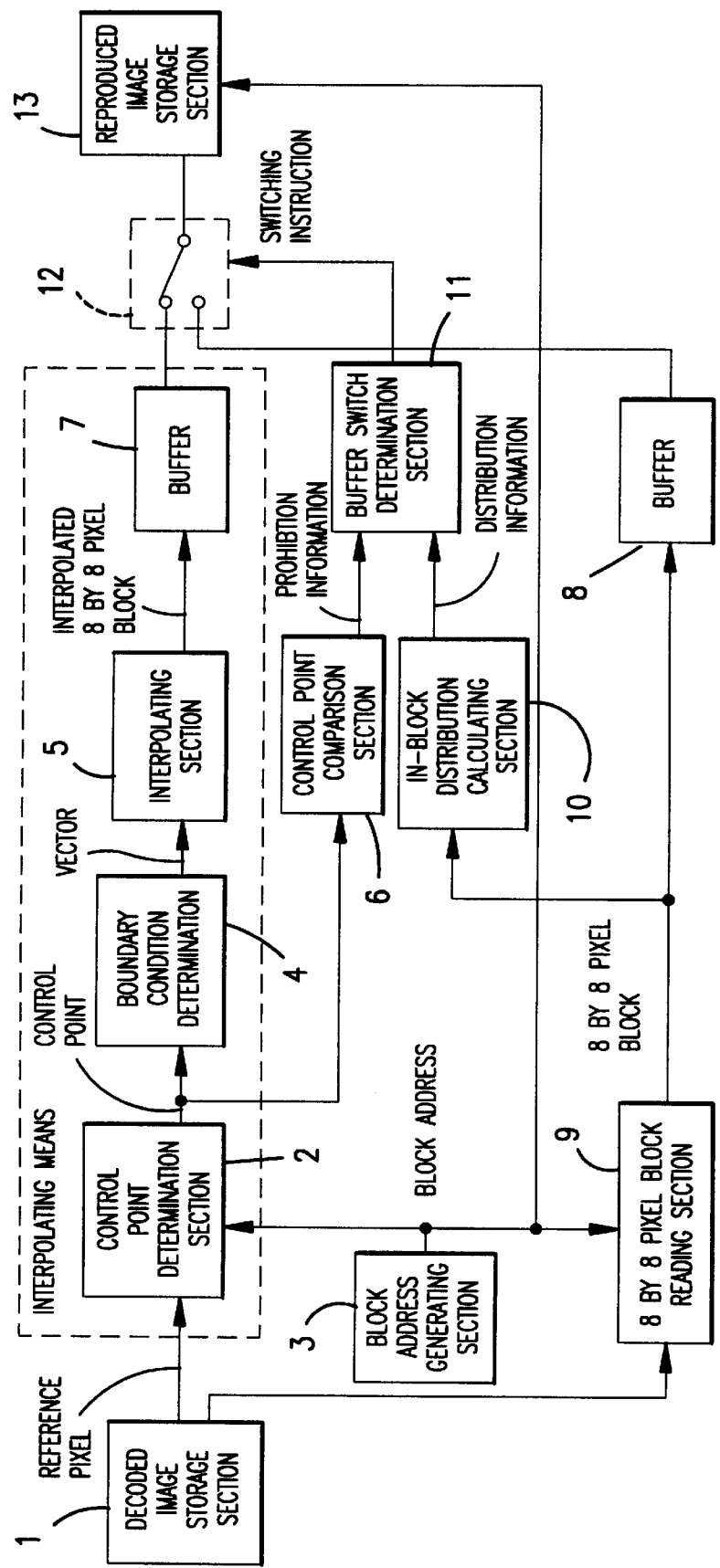
FIG. 1 is a block diagram of an image processor according to a first embodiment of the present invention.

FIG. 1 is a block diagram of an image processor according to a first embodiment of the present invention. The image processor comprises a decoded image storage section 1, a control point determination section 2, a block address generating section 3, a boundary condition determination section 4, an interpolating section 5, a control point comparison section 6, buffers 7 and 8, an 8×8 pixel block reading section 9, an in-block variance calculating section 10, a buffer switch determination section 11, a buffer switch 12, and a reproduced image storage section 13. The case where an 8 by 8 pixel is taken as a pixel block will now be described.

The decoded image storage section 1 holds an image decoded according to a block encoding method. The control point determination section 2 reads a reference pixel around a decoded block which is addressed by a block address issued from the block address generating section 3, and outputs control point information. The block address generating section 3 outputs a block address corresponding to each of the decoded blocks. The boundary condition determination section 4 determines vector information necessary to generate a bicubic interpolated surface patch on the basis of the control point information output from the control point determination section 2. The interpolating section 5 interpolates an 8 by 8 pixel region by means of the bicubic interpolated surface patch by use of the vector information output from the boundary condition determination section 4, whereby an 8 by 8 interpolated block is output. The control point comparison section 6 outputs prohibition information by comparing the sizes of a plurality of control points with each other. The buffer 7 temporarily holds the 8 by 8 interpolated block output from the interpolating section 5. The buffer 8 temporarily holds pixel blocks output from the 8 by 8 pixel block reading section 9. The 8 by 8 pixel block reading section 9 reads an 8 by 8 pixel region, which is addressed by the block address output from the block address generating section 3, from the decoded image storage section 1. The in-block variance calculating section 10 calculates the variance of the pixels within an input pixel block and outputs variance information. The buffer switch determination section 11 determines the switching between outputs of the buffers 7 and 8 on the basis of the result of the comparison carried out by the control point comparison point 6 and the variance information calculated by the in-block variance calculating section 10. Then, the buffer switch determination section 11 outputs a switching instruction to the buffer switch 12. The buffer switch 12 switches between the buffers 7 and 8 according to the instruction received from the buffer switch determination section 11. The decoded image storage section 13 holds the pixel block output from the buffer switch 12 at the block address designated by the block address generating section 3.

With reference to FIG. 1, one example of the operation of the image processor according to the first embodiment of the present invention will now be described. The outline of the operation of the image processor according to the first embodiment is as follow: A pixel block region of interest is interpolated. Whether or not block noise arises in that block region and whether or not that block region is an interpolation prohibited region are determined in parallel. It is decided which of the interpolated pixel block or the uninterpolated pixel block is output on the basis of the results of the two determination operations.

Figure 4:
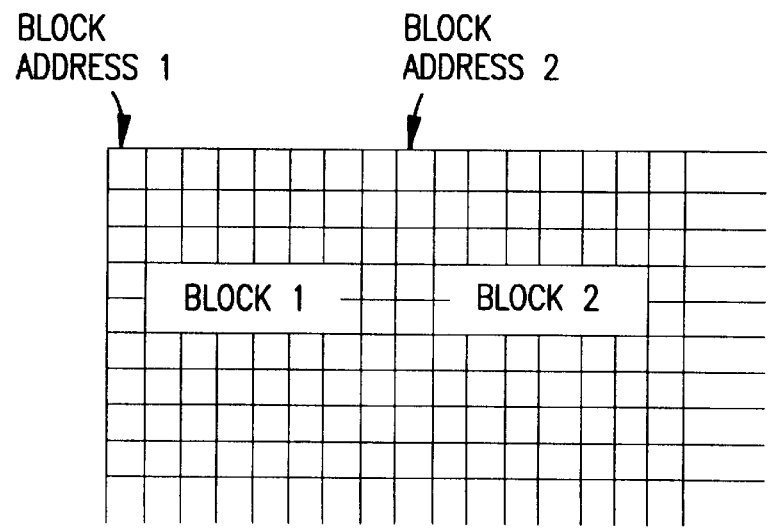
FIG. 4 is a matrix showing the relationship between a block address and a pixel block.

The decoded image storage section 1 holds images decoded by the transform coding method. The block address generating section 3 sequentially outputs, as block addresses, the addresses of the pixel blocks of the decoded image stored in the decoded image storage section 1. FIG. 4 is an illustration showing the relationship between block addresses and pixel blocks. The decoded image is divided into pixel blocks every 8 by 8 pixel region. As shown in FIG. 4, the block address generating section 3 generates the top left 8 by 8 pixel of each pixel block as a block address. The subsequent processing is carried out on a block address basis.

The interpolation of the pixel block will next be described. The interpolation is carried out on the basis of the bicubic Coons patch interpolation algorithm through the three steps; namely, the determination of control points, the determination of vectors, and the execution of interpolation. The pixel block which is designated as to be interpolated by the block address is called a block to be interpolated.

Figure 5A:
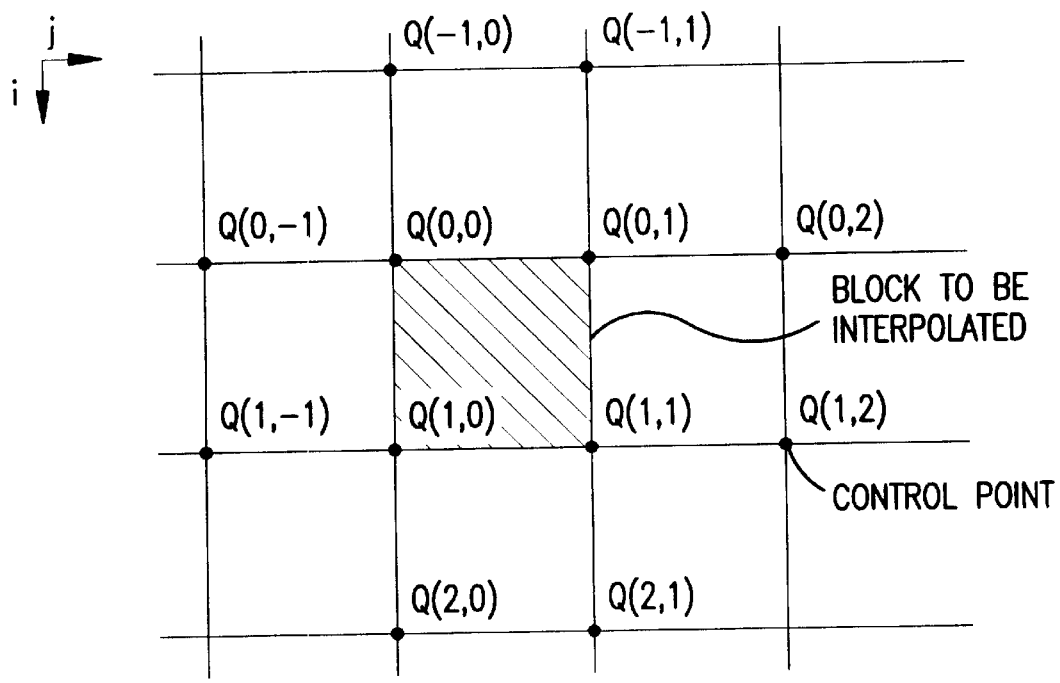
FIGS. 5A and 5B are schematic representations showing the relationship between a block to be interpolated and control points.
Figure 5B:
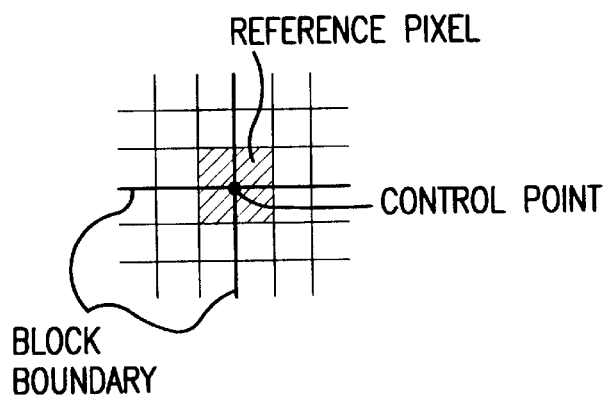

One example of the determination of control points will be described. FIGS. 5A and 5B are illustrations showing the relationship between a block to be interpolated and control points. The control point determination section 2 reads a reference pixel necessary to determine the control points from the decoded image storage section 1. As shown in black dots in FIG. 5A, the control points are twelve points which are hypothetically set around the block to be interpolated. In FIG. 5A, the hatched area is the 8 by 8 pixel block to be interpolated. Like FIGS. 2 and 3, the pixel block has the left top coordinates (0, 0), the left bottom coordinates (1, 0), the right top coordinates (0, 1), and the right bottom coordinates (1, 1). Each control point is positioned at an intersection between the block boundaries, and the coordinates of each control point is represented by (i, j). In FIG. 5A, the control points are respectively represented by positional vectors Q (i, j).

FIG. 5B is an enlarged view showing the neighborhood of the control point. Each cell represents a pixel, each black dot represents a control point, and a thick line represents the boundary between the blocks to be interpolated. It is possible to set, for example, a mean value of the four reference pixels around the hatched control point as the control point value. The addresses of the four reference pixels to be read can be easily calculated by previously setting horizontal and vertical offsets with respect to the block address. Assume that pixels at the boundaries of the images repeatedly exist outside the image, and that these pixels are set if the reference pixels are outside the image.

One example of the determination of vectors will now be described. The control points output from the control point determination section 2 are input to the boundary condition determination section 4. In this boundary condition determination section 4, each element of the 4 by 4 matrix of Equation (1), that is, four positional vectors and eight tangent vectors necessary to generate the bicubic interpolated surface patch, are determined in the following manner. The thus determined 12 vectors are output to the interpolating section 5.

Positional vector $Q(i, j)$: values of control pints in the "i" row, the "j" column (i, j=0, 1)

Tangent vector $Q_u(i, j)$ in the "u" direction=$(Q(i+1, j)-Q(i-1, j))/2$(i, j=0, 1)

Tangent vector $Q_v(i, j)$ in the "v" direction=$(Q(i, j+1)-Q(i, j-1))/2$(i, j=0, 1)

Finally, the execution of the interpolation will be described. The interpolating section 5 sets received vectors into the 4 by 4 matrix of Equation (1). The blending function is calculated from "u" and "v" corresponding to each pixel in the block, whereby the matrix of Equation (1) is calculated.

Figure 6:
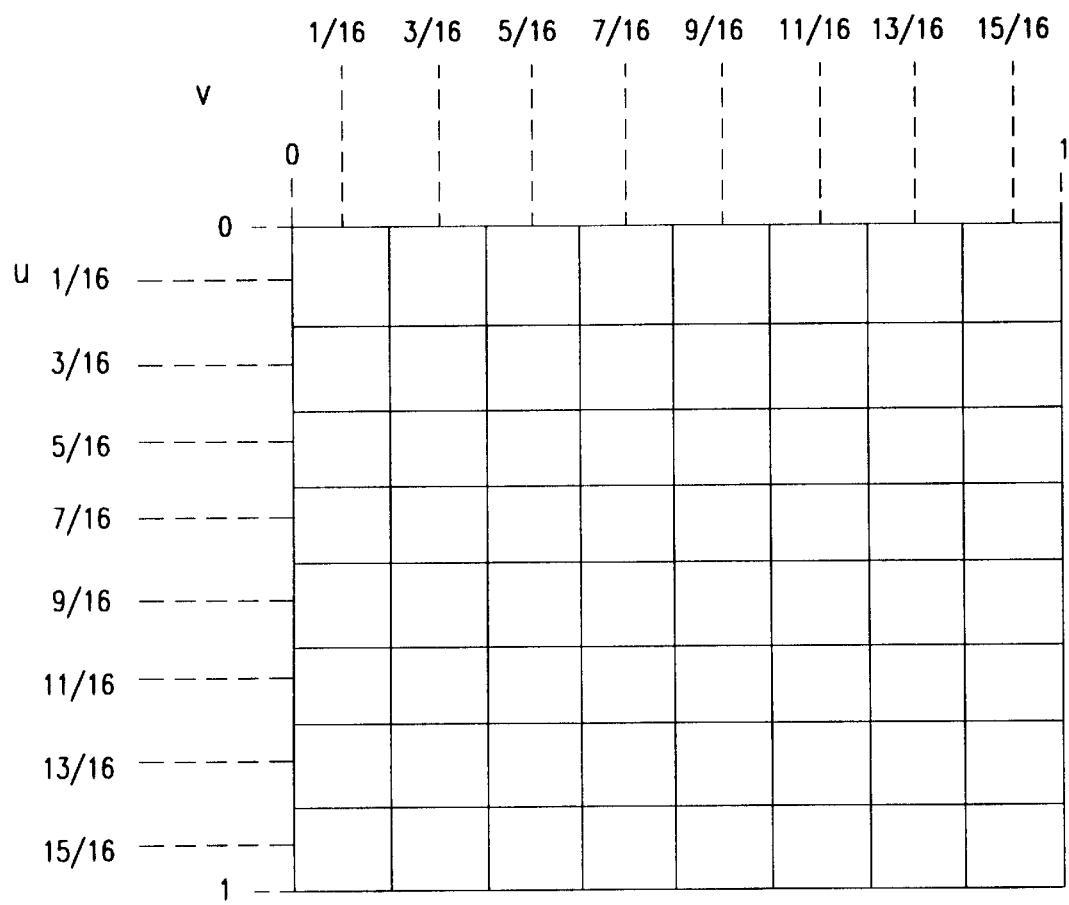
FIG. 6 is a matrix showing the designation of positions of interpolated pixels.

FIG. 6 is an illustration showing the designation of a pixel to be interpolated. On the assumption that the top left coordinates of the 8 by 8 pixel block to be interpolated are (0, 0) and the right bottom coordinates of the same are (1, 1) as shown in FIG. 6, the coordinates "u" and "v" at the center of each pixel become respectively $1/16, 3/16, 5/16, 7/16, \ldots 15/16$. In order to obtain each pixel value, it is only required to set the pixel in the form of the coordinates (u, v), calculate a blending function from the coordinates (u, v), and calculate the matrix of Equation (1). As a result of the calculation of the matrix, an interpolated 8 by 8 pixel block is obtained for the 8 by 8 pixel.

The interpolation of one pixel block is now completed through the above described steps. The thus obtained interpolated block is temporarily stored in the buffer 7.

In parallel to the above described interpolation of the pixel block, the 8 by 8 pixel block reading section 9 reads a pixel block, which corresponds to the block address output from the block address generating section 3, from the decoded image storage section 1. The thus read 8 by 8 pixel block is temporarily stored in the buffer 8, and then it is input to the in-block variance calculating section 10. Through the above described operations, the interpolated block generated as a result of interpolation and a non-processed pixel block are stored in the buffers 7 and 8, respectively. A decision as to which of an output from the buffer 7 and an output from the buffer 8 is selected as the final output, will be described.

In the present invention, two decision operations are carried out for selecting the buffer. The first decision is to decide an area, in which block noise arises, on the basis of the statistical information of the block. The second decision is to decide whether or not the area can be interpolated on the basis of the relationship in size between the control points around the block to be interpolated.

The determination of the area in which block noise arises will be described. As previously mentioned, the block noise is averaged within the block by block-encoding the area having a low degree of gradations at a high compression ratio, whereby stepwise gradations develop in the boundary between the adjacent blocks. As a result, the block having an even pixel value among the decoded pixel blocks can be detected as one having the possibility of block noise.

The in-block variance calculating section 10 calculates the variance of the pixels within the input pixel block. The variance of the pixels may be calculated as a mean square of a difference between each pixel value and an average. To reduce the volume of calculation, the variance of the pixels can be approximately calculated from the following expressions.

$$ave = X(i, j)/64$$

$$var = abs(X(i, j) - ave)$$

where $X(i, j)$ is a pixel value of the "i" row, the "j" column within the block, "ave" is a mean pixel value within the block, abs ( ) is a function for calculating the absolute value, and "var" is the variance of the pixels in the block.

Whether or not block noise arises in the decoded block is determined by comparing the variance "var" of the pixels in the block with a predetermined threshold value TH1. Specifically, the pixel block where var <TH1 belongs to the area having a small degree of gradations. Hence, that pixel block can be judged as one having a high possibility of block noise. If var≧TH1, the block has a large degree of gradations therewithin, and an edged or textured block is included in the block. The result of the determination as to whether or not the block noise arises in that block is output to the buffer switch determination section 11 as one bit of variance information.

Although whether or not the distribution of the pixels in the block is flat judged in the above descriptions, it is also possible to determine whether or not the pixel distribution is flat using a difference between the maximum value and the minimum value in the block other than variance.

According to the above described method of judging the area in which block noise arises, an erroneous determination will be often made if the block has an edge overlaid on the block boundary. Further, if a part of the edge is present in the block, the variance of the pixels becomes relatively small, which is apt to result in erroneous judgement. To prevent these problems, whether or not the block determined as one having the block noise can be interpolated is judged using the control points around that block.

Figure 7A:
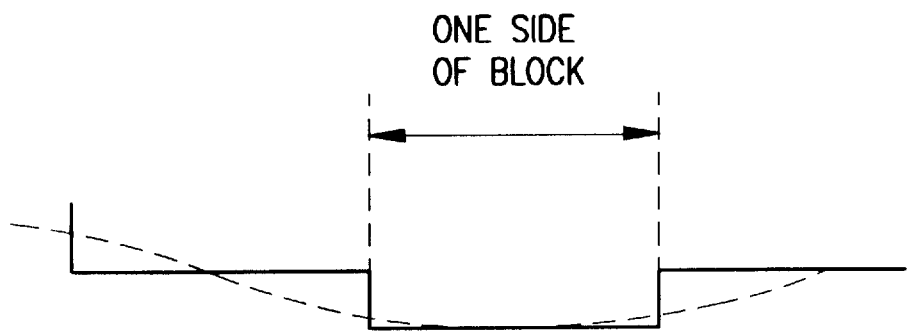
FIGS. 7A and 7B are schematic representations showing the edges block drooped as a result of bicubic surface patch interpolation.
Figure 7B:
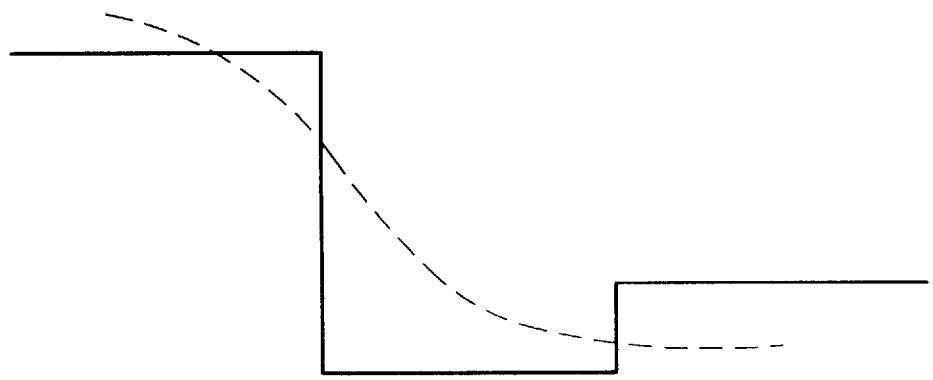

The decision as to whether or not the block can be interpolated will now be described. FIGS. 7A and 7B are illustrations showing the edges of block drooped as a result of the bicubic interpolation. In FIGS. 7A and 7B, the gradation of the decoded image are represented by a solid line, and the control points are represented by black points. Further, the cross section of the bicubic interpolation surface patch which is generated by use of the control points is represented by a broken line.

As shown in FIG. 7A, the gradations of the image within the area having a low degree of gradations become stepwise as they are represented by the solid line, and block noise arises in that area. As a result of the block noise, the smooth gradations can be reproduced by means of the bicubic interpolation surface patch designated by the broken line. However, as shown in FIG. 7B, if the edge is present in the block boundary, the gradations are interpolated in the way as represented by the bicubic interpolated surface patch, thereby resulting in the edge being drooped. For this reason, it will be better to stop the interpolation of the block in such a case as shown in FIG. 7B. It is possible to determine whether or not the interpolation of the block should be prohibited from the positional relationship between the control points.

Figure 8A:
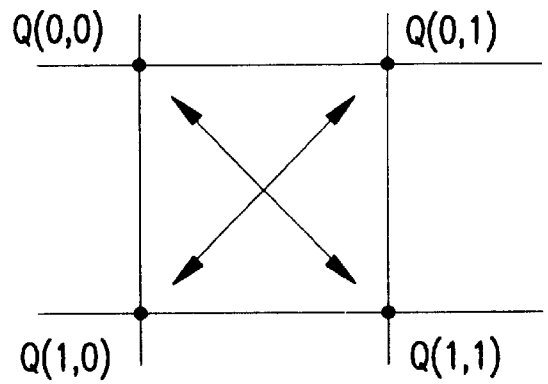
FIGS. 8A and 8B are illustrations of one example of the requirements for determination of an interpolation prohibited area.
Figure 8B:
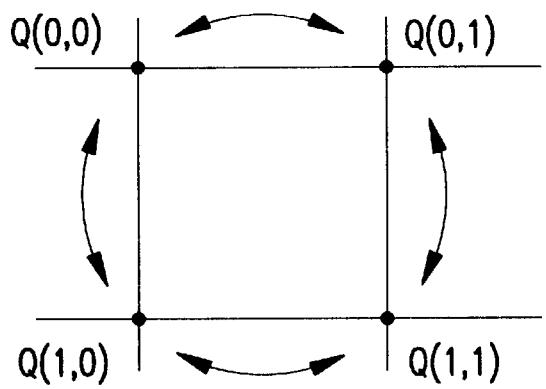

FIGS. 8A and 8B are illustrations showing one example of conditions used for determining the area where interpolation is prohibited. In this case, there are two types of decision conditions. As shown in FIG. 8A, a condition 1 is to prohibit interpolation if at least one of the differences between the absolute values of the control points on the diagonal is greater than a predetermined threshold value TH2. Further, as shown in FIG. 8B, a condition 2 is to prohibit interpolation if at least one of the differences between the absolute values of the adjacent control points is greater than a predetermined threshold value TH3. Only if neither the condition 1 nor the condition 2 is satisfied, the interpolation is judged as being possible to perform. As a matter of course, it is also possible to determine the area in which interpolation is prohibited using other conditions. One bit of prohibition information which represents the prohibition of interpolation is output to the buffer switch determination section 11.

On the basis of the received variance information and prohibition information, the buffer switch determination section 11 issues a switch instruction to the buffer switch 12. If the variance information shows that the pixel block is flat, the block noise arises in the pixel block. In addition, if the prohibition information shows that the pixel block can be interpolated, an interpolation block is selected.

Figure 9:
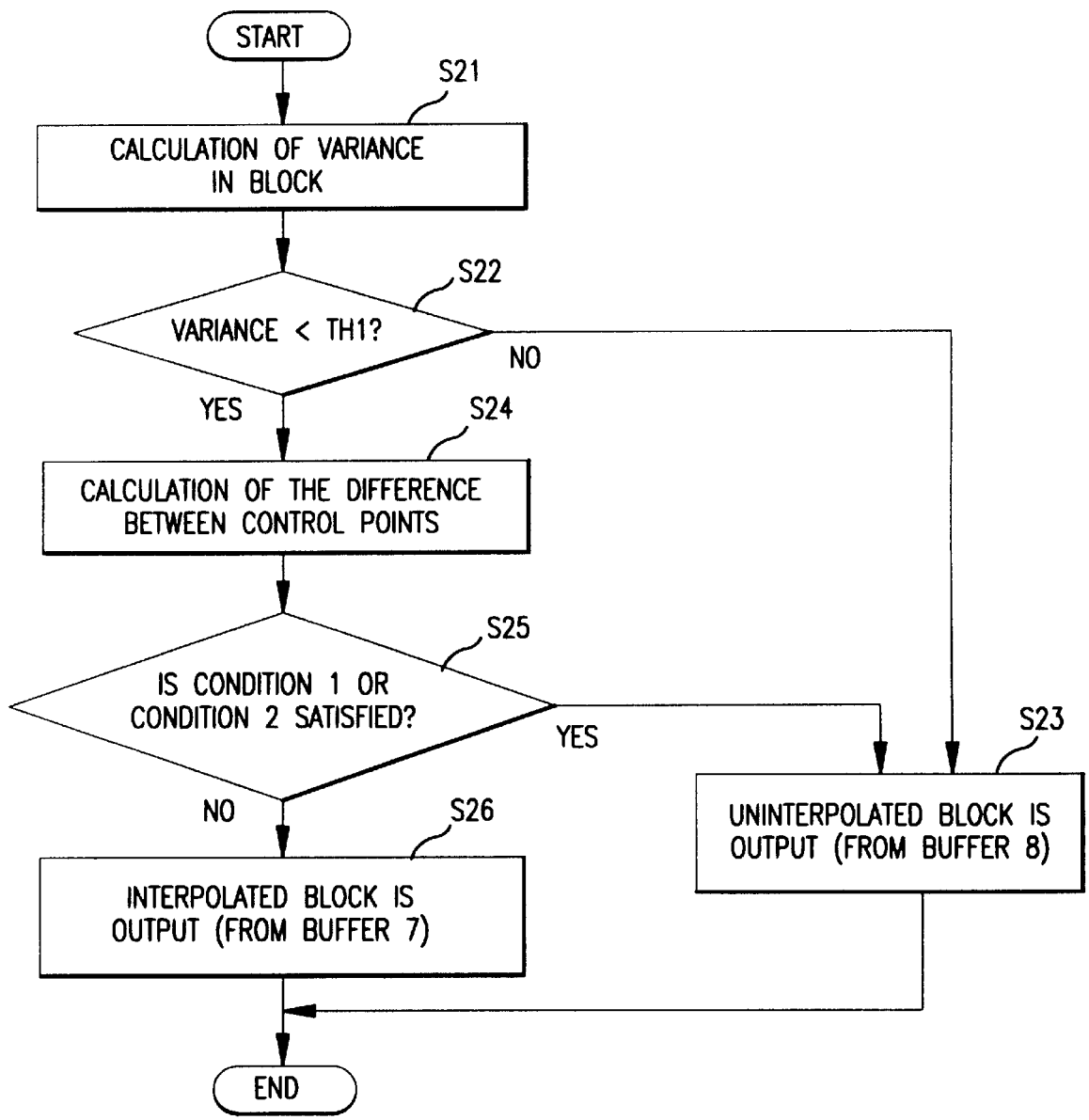
FIG. 9 is a flowchart showing one example of the switching between buffers.

FIG. 9 is a flowchart showing one example of the switching between the buffers. The operations of the above described control point comparison section 6, the in-block variance calculating section 10, and the buffer switch determination section 11 are grouped together as shown in FIG. 9. The control point comparison section 6 calculates the variance of the pixels in the block in step S21. It is judged in step S22 whether or not the variance is smaller than the predetermined threshold value TH1. If the variance is greater than the predetermined threshold 1, the uninterpolated pixel block in the buffer 8 is selected in step S23.

If the variance is smaller than the predetermined threshold TH1, it is judged in step S25 whether or not the conditions 1 and 2 shown in FIG. 8 are satisfied, on the basis of the difference between the control points calculated in step S24 by the control point comparison section 6. If either the condition 1 or the condition 2 is satisfied, interpolation will be prohibited. Then, an interpolated pixel block is selected in step S23. If neither the condition 1 nor the condition 2 is satisfied, an interpolated block stored in the buffer 7 is selected in step S26.

The reproduced image storage section 13 holds the pixel block stored in either the buffer 7 or the buffer 8 at the position corresponding to the block address output from the block address generating section 3.

In this way, the block noise resulting from the conversion encoding operation can be reduced through the above described operations. The above descriptions are directed to the 8 by 8 pixel block. However, the present invention is not limited by the block size, but it is possible to set an M×N pixel block having an arbitrary size. A pixel block having a different size can be processed in the same manner.

An image processor according to a second embodiment of the present invention will now be described. In the above described first embodiment, the continuity of the gradations between the interpolated blocks is ensured, and hence block noise is eliminated. Further, if the block noise is relatively small, the discontinuity of gradations between the interpolated block and the uninterpolated block is negligible.

However, if the block noise is large, the discontinuity of gradations becomes noticeable.

To prevent this problem, in the second embodiment, a 10 by 10 pixel block with the 8 by 8 pixel region being centered thereat, which is the unit basis of the conversion encoding operation, is read from the decoded image storage section 1. The pixels located on the boundary between the 8 by 8 pixel blocks are smoothed by use of the pixels around them.

Figure 10:
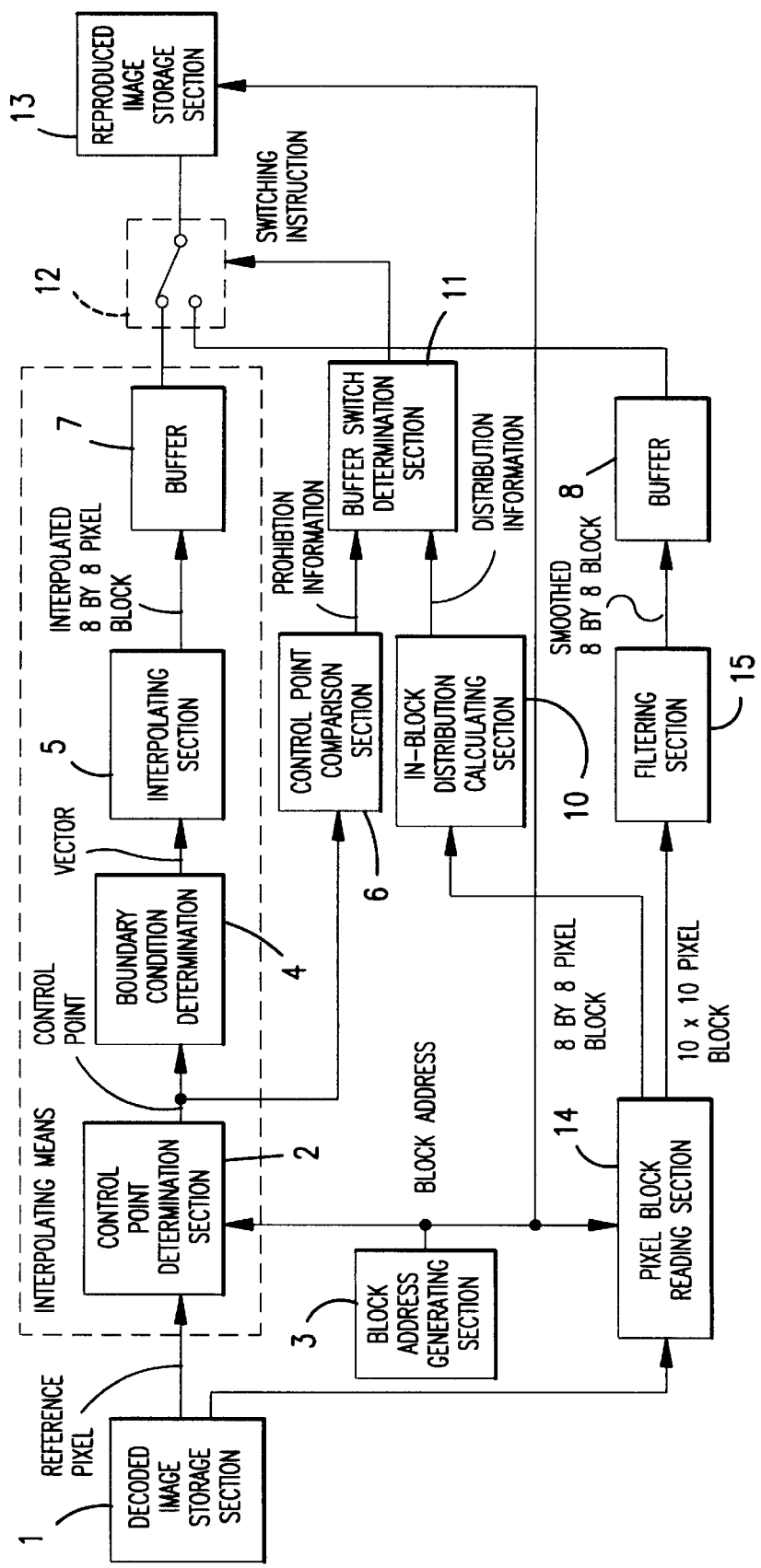
FIG. 10 is a block diagram of an image processor according to a second embodiment of the present invention.

FIG. 10 is a block diagram of the image processor of the second embodiment of the present invention. In the drawing, the reference numerals used to designate the elements in the first embodiment are also used for corresponding features of the second embodiment, and their explanations will be omitted here for brevity. A 10 by 10 pixel block reading section 14 reads a 10 by 10 pixel region with the 8 by 8 pixel region being centered thereat, from the decoded image storage section 1. The 8 by 8 pixel block is output to the in-block variance calculating section 10, whereas the 10 by 10 pixel block is output to the filtering section 15. The filtering section 15 subjects the 10 by 10 pixel block, which is received from the 10 by 10 pixel block reading section 14, to filtering treatment. The 8 by 8 pixel region centered at the 10 by 10 pixel block is output as a smoothed block.

Figures 11, 12:
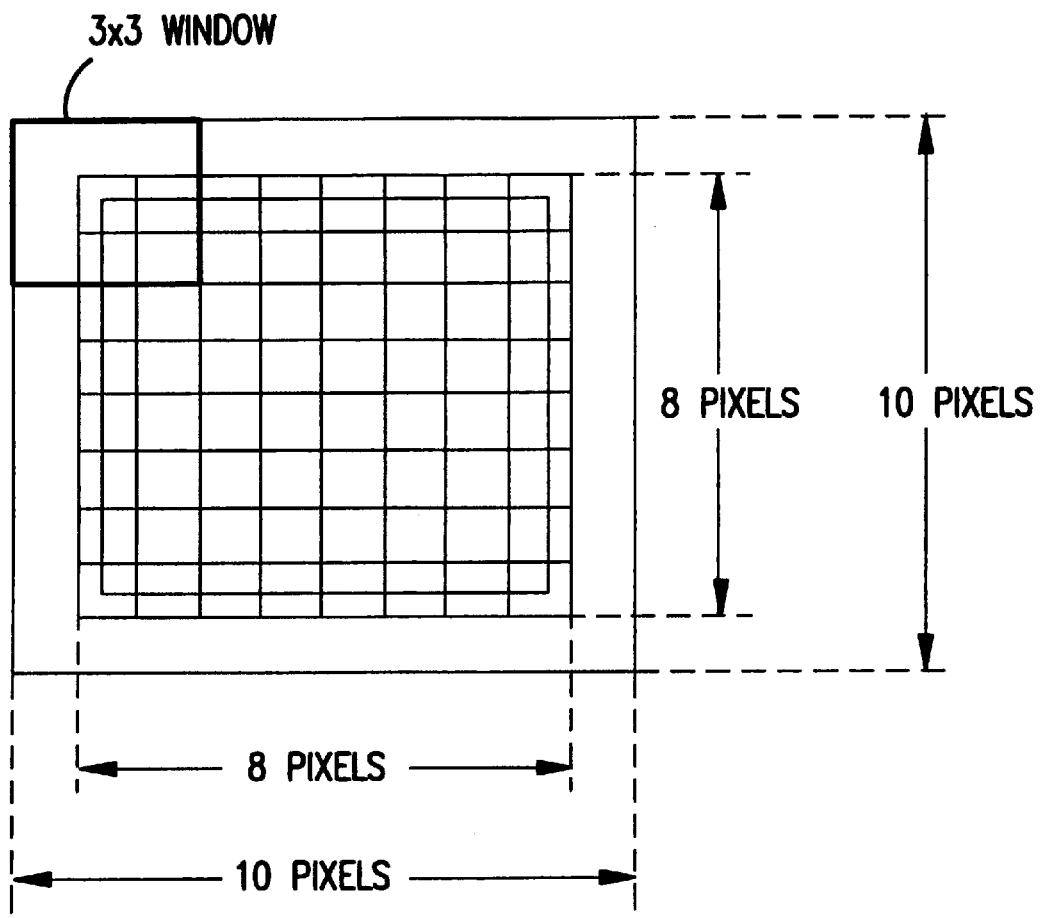
FIG. 11 is an illustration showing the filtering of a 10 by 10 pixel region.
FIG. 12 is an illustration showing a target pixel and surrounding pixels within a 3 by 3 window region.

One example of the operation of the image processor according to the second embodiment will now be described. FIG. 11 is an illustration for explaining the filtering of a 10 by 10 pixel region, and FIG. 12 is an illustration showing a target pixel and pixels surrounding the target pixel within a 3 by 3 window area. The 10 by 10 pixel block reading section 14 reads the 10 by 10 pixel region represented by a larger outer frame which is larger than the 8 by 8 pixel block having a grid pattern by two pixels in the respective vertical and horizontal directions. The filtering section 15 sets 3 by 3 windows represented by the thick line in FIG. 11 one by one in such a way that the center pixel of each 3 by 3 window becomes a pixel on the boundary between the 8 by 8 pixels blocks. As represented by the following equation, a mean value of the eight pixels $a_0$–$a_7$ around a pixel X shown in FIG. 12 is set to the value of the pixel X.

$$X=a_i/8$$

As a result, the gradations on the boundary between the block and the surrounding block can be reduced.

The in-block variance calculating section 10 calculates variance in the 8 by 8 pixel block output from the 10 by 10 pixel block reading section 14. Whether or not the block noise arises in the current pixel block is determined. In other respects, the image processor of the second embodiment operates in the same way as the image processor of the first embodiment, and hence the explanation thereof will be omitted.

As previously described, the uninterpolated block is subjected to the smoothing treatment which the boundary pixels undergo, in the second embodiment. Consequently, even in the case of relatively large block noise, noise reduction effects can be attained.

The second embodiment shown in FIG. 10 is arranged so as to select either the interpolated block or the smoothed block. It is also possible to arrange the image processor such that if the edge is present in the boundary between the pixel blocks, the decoded block is also supplied to the buffer switch 12 as another alternative to prevent the edge from being drooped so that any one of the interpolated block, the smoothed block, and the decoded block can be selected.

Although the 3 by 3 pixel filter is used as the filtering section 15 in the second embodiment, it is also possible to use filters having a variety of sizes, for example, a 5 by 5 pixel filter, as the filtering section 15. Where a 5 by 5 pixel filter is used, a 12 by 12 pixel block, which is larger than the 8 by 8 pixel block by four blocks in the respective vertical and horizontal directions, will be read.

Further, although the pixel on the boundary between the 8 by 8 pixel blocks is smoothed in the second embodiment, the present invention is not limited to this. More than two pixels on the boundary can be smoothed.

The previously mentioned second embodiment is not limited to the 8 by 8 pixel block as the first embodiment, the second embodiment can cope with the M by N matrix of pixels. In this event, it is only required to read a (M+2i)× (N+2i) matrix of pixels for filtering purposes.

As is evident from the above descriptions, each pixel block is subjected to block noise reduction depending on the characteristics of that pixel block. As a result, it becomes possible to reduce block noise without drooping the edge of the pixel block.

To carry out interpolation in order to reduce the block noise, boundary conditions for interpolation are set on the basis of a plurality of reference pixels surrounding the target pixel, and the block is interpolated into a patch. The boundary conditions are shared between the adjacent interpolated pixel blocks, and hence the interpolated blocks are smoothly connected together. As a result, contiguous gradations can be reproduced from the areas in which the block noise arises.

In addition to the determination of the degree of the flatness of pixels in the block, the determination of the block which can be interpolated is made by comparing the differences between the control points at the time of interpolation. Therefore, the edge of the block is prevented from becoming drooped by interpolating the edge.

Further, if the block is not interpolated, the pixel on the boundary between the decoded blocks and several pixels which include the boundary are smoothed together with the pixels surrounding them. In the event of large block noise, the gradations between the interpolated block and the uninterpolated block can be improved.

Several embodiments of the invention have now been described in detail. It is to be noted, however, that these descriptions of specific embodiments as merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. An image processor comprising:
   storage means for holding decoded blocks to which a block-encoded image is decoded for each rectangular region consisting of an M by N matrix of pixels;
   interpolating means which provides an interpolated block by reading a plurality of reference pixels having a predetermined positional relationship with the decoded blocks from said storage means and by interpolating gradations in the decoded blocks using a interpolated surface under boundary conditions set on the basis of the reference pixels;
   first determination means which determines whether or not the distribution of pixels in the decoded block is flat, on the basis of the statistical information of the decoded block;
   second determination means which determines whether or not the pixel distribution can be interpolated, on the basis of the boundary conditions; and
   selecting means which selects either the interpolated block or the decoded block on the basis of the results of said first and second determination means.

2. An image processor as defined in claim 1, wherein said first determination means calculates the variance of the pixels in the decoded block or a difference between the maximum value and the minimum value of the decoded block, and said first determination means outputs, as the result of first determination, information as to whether or not the decoded block is flat by comparing a predetermined threshold with at least either the pixel variance or the difference.

3. An image processor as defined in claim 1, wherein said second determination means compares a predetermined threshold value to a difference between adjacent control points as well as comparing a predetermined threshold value to a difference between control points positioned in a diagonal relationship with each other with regard to four control points around the decoded block, and said second determination means outputs information as to whether any difference exceeds the threshold values.

4. An image processor as defined in claim 1, wherein the value of a pixel which is the most analogous to the reference pixel among pixels in the boundary is set as the value of the reference pixel if the reference pixel is outside the image.

5. An image processor as defined in claim 1, wherein the interpolating means comprises a control point determination section for determining a control point from the plurality of reference pixels, a boundary condition determination section for determining the boundary conditions from the control point, and an interpolating section for generating an interpolated block by interpolating the rectangular region consisting of the M by N matrix of pixels using bicubic interpolated surface patch on the basis of the boundary conditions.

6. An image processor as defined in claim 5, wherein the control point is located at an intersection between boundaries of the decoded blocks in said storage means, and four pixels around the intersection are read as the plurality of reference pixels for each intersection, whereby a mean value is set.

7. An image processor as defined in claim 5, wherein the boundary conditions include eight tangent vectors defined by differences between four control points on the periphery of the decoded blocks in said storage means and two adjacent control points in the respective vertical and horizontal directions at each control point.

8. An image processor comprising:
storage means for holding decoded blocks to which a block-encoded image is decoded for each rectangular region consisting of an M by N matrix of pixels;
interpolating means which provides an interpolated block by reading a plurality of reference pixels having a predetermined positional relationship with the decoded blocks from said storage means and by interpolating gradations in the decoded blocks using a interpolated surface under boundary conditions set on the basis of the reference pixels;
smoothing means which outputs an M×N matrix of pixels at the center of the block as a smoothed block by reading a (M+2i)×(N+2i) matrix of pixels, which is larger than the M×N matrix of pixels by "i" pixels in both vertical and horizontal directions, from the decoded block in said storage means, and by smoothing the (M+2i)×(N+2i) matrix of pixels read from said storage means;
first determination means which determines whether or not the distribution of pixels in the decoded block is flat, on the basis of the statistical information of the decoded block;
second determination means which determines whether or not the pixel distribution can be interpolated, on the basis of the boundary conditions; and
selecting means which selects either the interpolated block or the decoded block on the basis of the results of said first and second determination means.

9. An image processor as defined in claim 8, wherein the selecting means selects any one of the interpolated block, the smoothed block, and the decoded block on the basis of the results of determination of said first and second determination means.

10. A method of processing images, comprising:
storing decoded blocks in which a block-encoded image is decoded for each rectangular region of pixels;
reading a plurality of reference pixels having a predetermined positional relationship with the decoded blocks;
interpolating gradations in the decoded blocks using a curve with boundary conditions set on the basis of the reference pixels;
determining whether a distribution of pixels in the decoded block is substantially flat on the basis of the statistical information of the decoded block;
deciding whether the distribution of pixels can be interpolated on the basis of the boundary conditions; and
selecting the interpolated block or the decoded block in accordance with the results of whether the distribution of pixels is substantially flat and whether the distribution of pixels can be interpolated.

11. The method of claim 10, wherein determining whether the block is substantially flat includes calculating the distribution of the pixels in the decoded block or a difference between the maximum value and the minimum value of the decoded block and outputting information as to whether the decoded block is substantially flat by comparing a predetermined threshold with at least either the distribution of pixels or the difference.

12. The method of claim 10, wherein deciding whether the block can be interpolated includes comparing a predetermined threshold value to a difference between adjacent control points, comparing a predetermined threshold value to a difference between control points positioned in a diagonal relationship with each other with regard to four control points around the decoded block, and outputting information as to whether any difference exceeds the threshold values.

13. The method of claim 10, wherein the value of a pixel that is the most analogous to a reference pixel among pixels in the border is set as the value of the reference pixel if the reference pixel is outside the image.

14. The method of claim 10, further comprising:
smoothing the decoded block by smoothing the matrix of pixels, and wherein selecting includes selecting the interpolated block, the smoothed block or the decoded block on the basis of the results of whether the distribution of pixels is substantially flat and whether the pixel distribution can be interpolated.

15. The method claim 10, wherein the step of storing includes storing decoded blocks to which a block-encoded image is decoded for each rectangular region consisting of an M by N matrix of pixels.

16. The method of claim 10, wherein interpolating gradations includes determining a control point from the plurality of reference pixels, determining the boundary conditions from the control point and generating an interpolated block by interpolating the rectangular region of pixels using double tertiary curves on the basis of the boundary conditions.

17. The method of claim 16, wherein the control point is located at an intersection between boundaries of the decoded blocks, and wherein four pixels around the intersection are read as the plurality of reference pixels for each intersection.

18. The method of claim 16, wherein the boundary conditions include eight tangential vectors defined by differences between four control points on the periphery of the decoded blocks and two adjacent control points in the respective vertical and horizontal directions at each control point.

* * * * *